Figure 1:
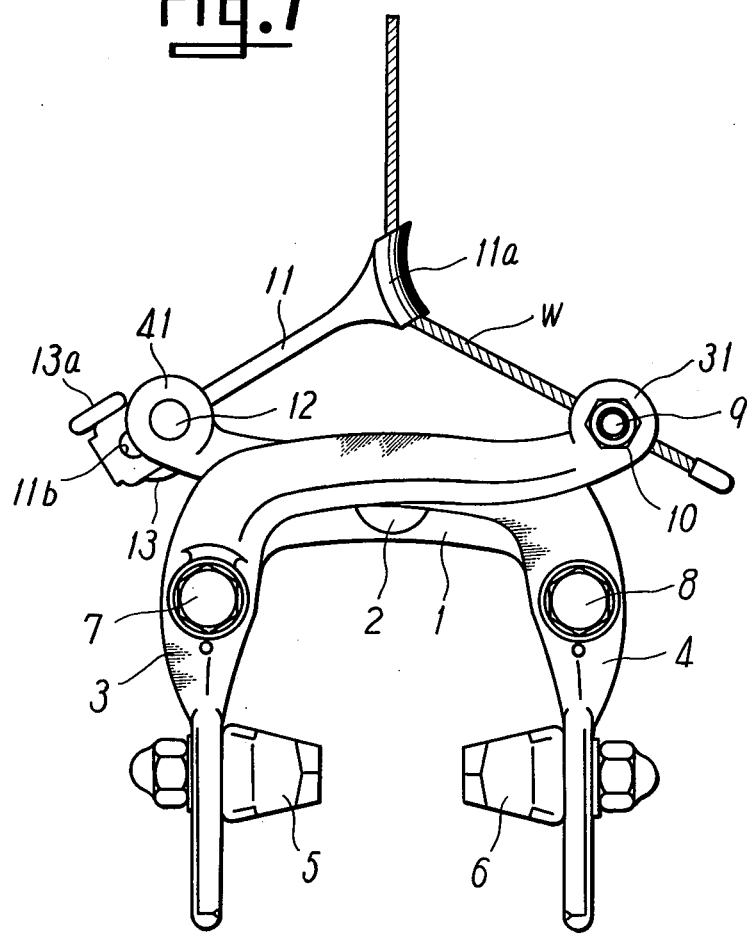

United States Patent [19]

Kine

[11] 4,027,746
[45] June 7, 1977

[54] CENTER-PULL TYPE CALIPER BRAKE FOR A BICYCLE

[75] Inventor: Masayoshi Kine, Sakai, Japan

[73] Assignee: Shimano Industrial Company, Limited, Osaka, Japan

[22] Filed: Aug. 16, 1976

[21] Appl. No.: 714,507

[30] Foreign Application Priority Data

Sept. 5, 1975 Japan ............... 50-123353[U]
Sept. 5, 1975 Japan ............... 50-123354[U]

[52] U.S. Cl. .................... 188/24; 188/196 M
[51] Int. Cl.² ............................ F16D 65/54
[58] Field of Search ........ 188/2 D, 24, 26, 196 M

[56] References Cited

UNITED STATES PATENTS

| 1,800,473 | 4/1931 | Sanford | 188/196 M |
| 2,460,204 | 1/1949 | Vacher | 188/24 |
| 2,699,228 | 1/1955 | Mennesson | 188/24 |

FOREIGN PATENTS OR APPLICATIONS

| 896,245 | 4/1944 | France | 188/24 |
| 455,967 | 4/1950 | Italy | 188/24 |
| 11,965106 | 5/1907 | United Kingdom | 188/24 |

Primary Examiner—Duane A. Reger
Attorney, Agent, or Firm—Stevens, Davis, Miller & Mosher

[57] ABSTRACT

A center-pull type caliper brake for a bicycle having a pair of brake arms. One of the brake arms directly secures therewith a terminal of a control wire and the other pivotally supports a retainer having a grip which retains the control wire.

7 Claims, 5 Drawing Figures

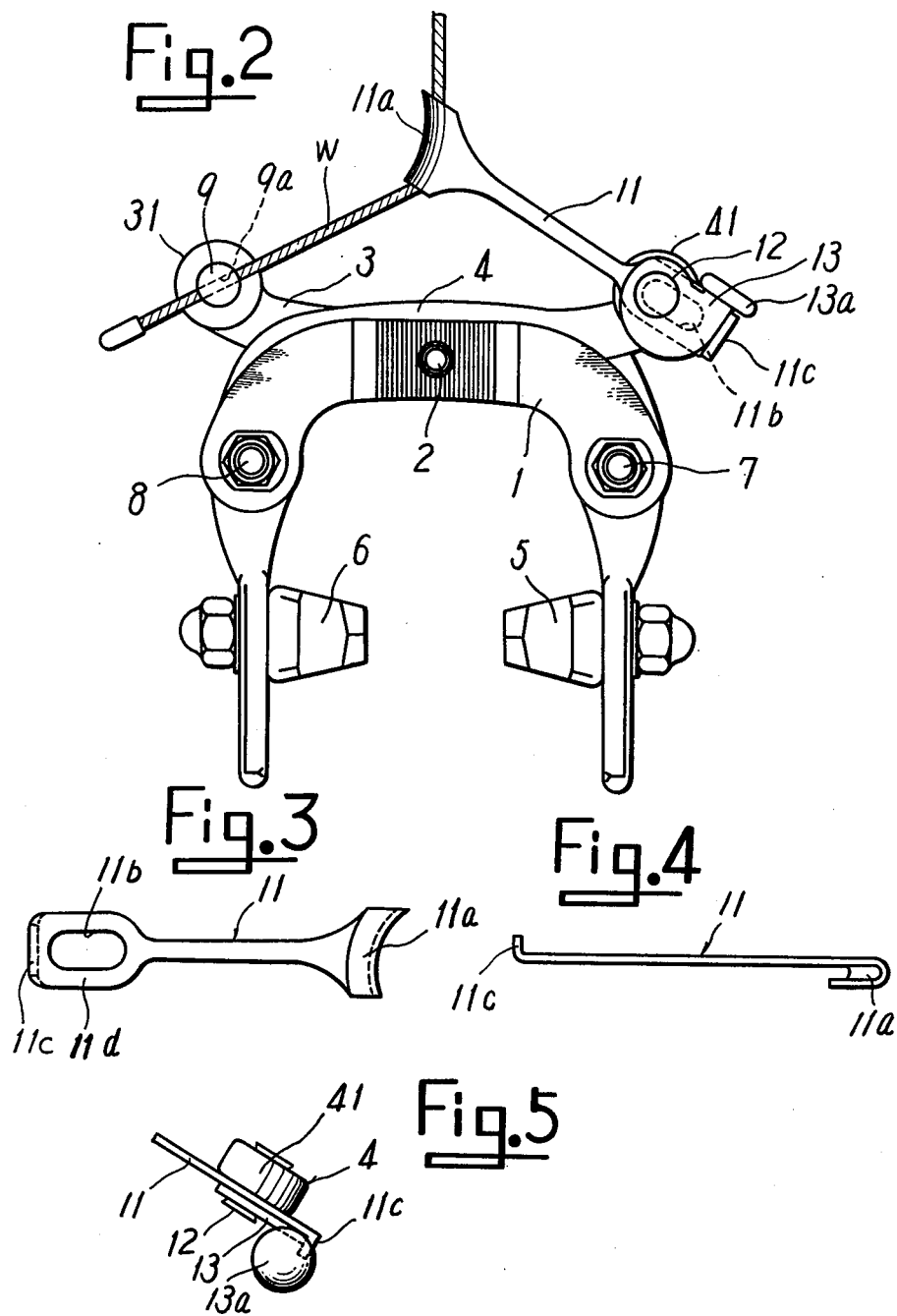

CENTER-PULL TYPE CALIPER BRAKE FOR A BICYCLE

This invention relates to a center-pull type caliper brake for a bicycle and more particularly to a center-pull type caliper brake comprising a fixed arm fixed to the bicycle frame, a pair of brake arms pivotally supported to both ends of the fixed arm having brake shoes respectively, and a control wire for oscillating the brake arms.

Generally, this kind of brake is provided with a short wire connecting an idle end of each of the brake arms, which wire is clamped at substantially its middle portion by a U-like bent clamp connected with the control wire by means of a set screw and nut so that the control wire is pulled to stretch the connecting wire through the clamp thereby exerting braking action.

The stretched connecting wire oscillates the brake arms to mutually move brake shoes inwardly toward a wheel's rim so as to be in contact therewith for the braking action.

In a conventional structure of the center-pull type caliper brake employing the connecting wire, first, both ends of the wire should be connected to the brake arms respectively, and second, the connecting wire is required to be connected with the control wire so that a set screw and nut are required. As a result, the brake is disadvantageous because of the complicated connection from the control wire to the brake arms and the consequential expensive manufacturing cost.

A further problem in the conventional brake is that the brake shoes are adjusted, in the spaced interval therebetween by adjusting a secured end of an outer cable housing the control wire therein. As a result, the adjustment is cumbersome and time consuming, and it is necessary for a quick-release means to be particularly provided at the outer cable's secured end when the brake shoes are spread to the maximum extent at their spaced interval for replacing a bicycle wheel with a new one. As a result, the brake is complex in structure and expensive to manufacture.

The invention has been designed in view of the aforesaid problems. A main object of the invention is to provide a center-pull type caliper brake for a bicycle, which has no conventional connecting wire and no connection thereof with the control wire so as to be simple in construction and inexpensive to manufacture. Another object is to provide a center-pull type caliper brake which is easy to assemble. Still another object is to provide a center-pull type caliper brake which is easily adjustable in the spaced interval between opposite brake shoes and is available for replacement of the bicycle wheel by enlarging the space through its adjustment to the maximum extent.

The invention is characterized in that, first, one of a pair of brake arms has its idle end directly securing therewith a terminal of the control wire and the other has its idle end pivotally supporting a retainer which retains the control wire. The retainer is adjustable in length between its attachment to the idle end of the other brake arm and its control-wire-retaining portion to thereby adjust the space between the opposite brake shoes.

In addition, the adjustment of the spaced interval between the brake shoes includes maximum enlargement of the space for permitting the wheel to pass therethrough as well as proper spacing between the brake shoes and the wheel rim respectively.

The aforesaid and other objects and the characteristics of the invention will be apparent from the following description of embodiments in connection with the accompanying drawings, in which FIG. 1 is a front view of a center-pull type caliper brake of the invention, FIG. 2 is a rear view thereof, FIG. 3 is a front view of a retainer only, FIG. 4 is a side view thereof, and FIG. 5 is a side view of only an attachment of a retainer to one of brake arms.

Referring to the drawings, the reference numeral 1 denotes a fixed arm, which is fixed to a bicycle frame (not shown) through a penetrate bolt 12, and is formed in a counter U-like shape. At both ends of the fixed arm are pivotally supported a pair of brake arms 3 and 4 having brake shoes in oscillating relation through pivots 7 and 8.

The brake arms 3 and 4 are formed in counter L-like shapes in front view. Normal of the arms 3, 4 portions have, at the lower end thereof, the brake shoes 5 and 6 respectively. The horizontal portions of the arms 3, 4 cross each other along the fixed arm 1, and the idle ends of the arms 3, 4 are slightly upwardly bent and provided with circular mounting seats 31 and 41 respectively.

At the seat 31 of the idle end of one arm 3 is provided a holder comprising a set screw 9 and nut 10 for securing therewith the control wire at its terminal passed through a bore 9a in the screw 9. The seat 41 of the idle end of the other arm 4 is attached to a retainer 11 for retaining a part of the control wire w as described hereinafter.

The retainer 11 has at one end a base 11d in contact with the surface of the seat 41 and extends at the other end toward a center line perpendicular to the horizontal portions of the brake arms. The extension is bent at its utmost end and, as shown in FIG. 4, formed in a U-like shaped grip 11a by which the control wire w is held at its portion spaced from the secured end so that the wire is pulled at the portion toward the aforesaid center line. The base 11d, through which the retainer 11 is attached to the brake arm 4, is slotted at 11b lengthwise thereof and bent to form an upright wall 11c. A spindle 12 is inserted into the slot 11b to rotatably support therewith the retainer 11 and a cam plate 13 of a lever 13a so that the edge of the cam plate 13 may abut the upright wall 11c. Thus, rotation of the cam changes the distance between the seat 41 and the grip 11a and thereby adjusts the spaced interval between the opposing brake shoes 5 and 6.

In addition, the aforesaid adjustment of the effective length of the retainer 11 may, other than by use of the cam plate, be carried out by use of a threaded stem extending longitudinally from the base of the retainer 11 and passing through a bore perforated in the wall formed at the seat 41 and a rotatable adjust nut which is screwed with the stem from the outside of the wall. The aforesaid through bore is formed in an axially arched slot for permitting the retainer 11 to oscillate around the mount spindle 12.

Also, the aforesaid grip 11a, which is bent to retain the control wire with the inner surface of the bending, may substitute for other clamps for clamping the wire.

In the center-pull type caliper brake constructed as aforesaid, when the control lever is operated to pull the control wire, the grip 11a is moved upwardly to allow the retainer 11 to oscillate, and the control wire w, between the grip 11a and the secured end, is stretched upwardly so as to permit the brake arms to oscillate around the pivot, thereby effecting braking action. Furthermore, when the brake is mounted to the bicycle or the brake shoes wear after use, the rotation of the cam plate 13 makes it possible to rapidly and readily adjust, as aforesaid, the spaced interval between the opposing brake shoes 5 and 6.

In greater detail, when the brake is mounted to the bicycle or the wheel is to be replaced by new one after attachment of the brake, the cam plate 13 is rotated to move the retainer 11 lengthwise to the maximum extent toward the aforesaid common center line of the brake arms 3 and 4 so as to enlarge the space between the opposing brake shoes 5 and 6 to the maximum extent. The extent of enlargement depends upon the length of the slot 11b. Hence, the length of the slot 11b is chosen so that the space may be enlarged to a distance greater than the entire thickness of the wheel. Consequently, the cam plate 13 is rotated to the limit so as to enlarge the space to the maximum extents, thereby permitting the brake to be fitted to the bicycle without any hindrance and the wheel to be replaced after attachment of the brake.

Also, when the brake shoes 5 and 6 wear after long use in the bicycle, an increase of the space caused by the wear can be offset by the cam operation. In that case, the cam plate 13 is not fully rotated, but is instead rotated at the necessary angle to compensate for the wear. The cam plate can be kept in its adjusted position stably by the cam formation. However other position-keep means, such as a lock screw, preferably be added. When the thread stem is substituted for the cam plate 13, the position-keep means is unnecessary.

However, the cam plate 13 enables the space between the brake shoes to be increased to the maximum extent whereby quick change of the wheel is expectable.

Furthermore, in the brake of the invention, the spaced interval between opposite brake shoes can be adjusted by optional adjustment of the effective length of the retainer between the attachment thereof to the idle end of the brake arm and the retaining portion of the control wire. Hence, the spaced interval between the brake shoes can be easily and quickly adjusted to the desired length, and can be enlarged to an extent which is wider than the thickness of the wheel so that a brake can be easily attached to the bicycle and a wheel can be changed after the brake is attached.

While the form of embodiment of the invention as herein described constitutes a preferred form, it is to be understood that other forms might be adopted, all coming within the scope of the claims which follow.

What is claimed is:

1. A center-pull type caliper brake for a bicycle, said brake comprising:
   an arm fixed to the frame member of the bicycle;
   a pair of brake arms pivotally mounted on the ends of said fixed arm in freely oscillating relation through pivots, each of said brake arms having a portion which extends substantially horizontally;
   a brake shoe on one end of each of said brake arms;
   a control wire for operating said brake arms;
   a holder, on the other idle end of one of said brake arms, for securing one end of said control wire thereto; and
   a retainer pivotally mounted on the other idle end of the other one of said brake arms, said retainer having a base on one end thereof attached to the other idle end of the other one of said brake arms and an extension extending from said base toward a center line perpendicular to the horizontal portions of said brake arms, said extension having a grip for retaining an intermediate portion of the control wire.

2. The center-pull caliper brake according to claim 1, wherein the distance between the grip and the other idle end of the other brake arm is adjustable so that the spacing of the brake shoes from each other can be adjusted.

3. The center-pull type caliper brake according to claim 2, further comprising:
   means defining a longitudinally extending slot in the base of said retainer;
   a mounting spindle fixed to the other idle end of said other brake arm, said spindle being disposed in said slot so that the retainer is longitudinally movable with respect to and pivotally movable around said mounting spindle;
   a cam means rotatably mounted on said spindle, said cam means being rotatably controlled to longitudinally move said retainer relative to said mounting spindle to thereby adjust the distance between the grip and the other idle end of the other brake arm.

4. The center-pull caliper brake according to claim 3, wherein said slot is longer than a predetermined amount so that when said cam means is rotatably controlled to enlarge the spacing between said brake shoes to a maximum extent, the spacing interval is greater than the thickness of a wheel to be fitted to the bicycle.

5. The center-pull type caliper brake according to claim 3, further comprising means for keeping said cam means in a selected rotatably controlled position.

6. The center-pull type caliper brake according to claim 1, wherein the grip is U-shaped in cross-section.

7. A center-pull type caliper brake for a bicycle, said brake comprising:
   an inverted substantially U-shaped arm fixed to a frame member of the bicycle;
   a pair of inverted substantially L-shaped brake arms, one of said brake arms being pivotally mounted on one free end of the fixed arm and the other one of said brake arms being pivotally mounted on the other free end of said fixed arm, each of said brake arms having a portion which extends substantially horizontally and a portion which extends substantially vertically;
   a brake shoe on the free end of the vertical portion of each of said brake arms;
   a control wire for operating said brake arms;
   a holder, on the free end of the horizontal portion of said one brake arm, for securing one end of said control wire thereto;
   a retainer pivotally mounted on the free end of the horizontal portion of said other brake arm, said retainer comprising:
   a base on one end thereof attached to the free end of the horizontal portion of said other brake arm, said base having a longitudinally extending slot defined therein; and
   an extension extending from said base toward a center line perpendicular to the horizontal portions of the brake arms, said extension terminating adjacent the center line in a substantially U-shaped grip for retaining an intermediate portion of the control wire;
a mounting spindle fixed to the free end of said other brake arm, said spindle being disposed in said slot;
said retainer being movable longitudinally movable with respect to and pivotally movable around said mounting spindle; and
a cam means rotatably mounted on said mounting spindle, said cam means being rotatably controlled to longitudinally move said retainer relative to said mounting spindle to thereby adjust the distance between the grip and the free end of the horizontal portion of the other brake arm so that the spacing of the brake shoes from each other can be adjusted.

* * * * *